(12) United States Patent
Kissel et al.

(10) Patent No.: US 12,364,177 B2
(45) Date of Patent: Jul. 22, 2025

(54) SELF-PROPELLED AGRICULTURAL WORKING MACHINE

(71) Applicant: DEERE & COMPANY, Moline, IL (US)

(72) Inventors: Max Kissel, Kaiserslautern (DE); Felipe De Moraes Boos, Kaiserslautern (DE); Volker Kegel, Mannheim (DE); Andre Klein, Kaiserslautern (DE); Nicolai Tarasinski, Frankenthal (DE)

(73) Assignee: Deere & Company, Moline, IL (US)

( * ) Notice: Subject to any disclaimer, the term of this patent is extended or adjusted under 35 U.S.C. 154(b) by 516 days.

(21) Appl. No.: 18/049,011

(22) Filed: Oct. 24, 2022

(65) Prior Publication Data

US 2023/0148466 A1 May 18, 2023

(30) Foreign Application Priority Data

Nov. 17, 2021 (DE) .............................. 102021130011

(51) Int. Cl.
*A01B 51/02* (2006.01)
*A01B 59/00* (2006.01)

(52) U.S. Cl.
CPC .......... *A01B 51/026* (2013.01); *A01B 59/002* (2013.01)

(58) Field of Classification Search
CPC .............................. A01B 51/026; A01B 59/002
See application file for complete search history.

(56) References Cited

U.S. PATENT DOCUMENTS

| 4,090,736 | A | | 5/1978 | Finney |
| D253,057 | S | | 10/1979 | Fachini et al. |
| D351,843 | S | | 10/1994 | Larson et al. |
| D355,919 | S | | 2/1995 | Larson et al. |
| 5,575,316 | A | * | 11/1996 | Pollklas ............... A01D 43/087 |
| | | | | 141/96 |
| 5,638,619 | A | | 6/1997 | Bowling |
| 5,749,783 | A | * | 5/1998 | Pollklas ................... G05D 3/12 |
| | | | | 56/10.2 D |
| D568,342 | S | | 5/2008 | Kleingraeber |
| 7,484,587 | B2 | * | 2/2009 | Portscheller ........... B60N 2/143 |
| | | | | 180/89.12 |
| D599,830 | S | | 9/2009 | Jacobsthal et al. |
| D639,826 | S | | 6/2011 | Barrelmeyer |

(Continued)

FOREIGN PATENT DOCUMENTS

DE 1215419 B 4/1966
DE 19705842 A1 8/1998
(Continued)

OTHER PUBLICATIONS

United States Notice of Allowance, U.S. Appl. No. 29/867,404, filed Dec. 13, 2023, 08 pages.
(Continued)

*Primary Examiner* — Ramsey Refai (57) ABSTRACT

A self-propelled agricultural working machine comprising: a drive module with a load-bearing chassis; agricultural implements for performing an agricultural operation; an electronic control unit for controlling the ground-engaging member; and an operator station with an operator interface, the operator station configured to be removably attached to the load-bearing chassis.

19 Claims, 6 Drawing Sheets

(56) References Cited

U.S. PATENT DOCUMENTS

| | | | |
|---|---|---|---|
| 8,428,829 B2 * | 4/2013 | Brunnert | A01D 43/087 701/50 |
| D717,345 S | 11/2014 | Budde | |
| D797,813 S | 9/2017 | Budde | |
| D826,994 S | 8/2018 | De Smet et al. | |
| D838,295 S | 1/2019 | Schwalbe et al. | |
| D855,661 S | 8/2019 | Krohn et al. | |
| D880,539 S | 4/2020 | Depoorter et al. | |
| D892,175 S | 8/2020 | Leeb | |
| D895,688 S | 9/2020 | Wagner | |
| D898,782 S | 10/2020 | Wagner | |
| D923,061 S | 6/2021 | Leeb | |
| D978,922 S | 2/2023 | Rajopadhye et al. | |
| D982,040 S | 3/2023 | Charles et al. | |
| D986,294 S | 5/2023 | Dhananjay et al. | |
| 2005/0197175 A1 * | 9/2005 | Anderson | A01G 23/00 460/1 |

FOREIGN PATENT DOCUMENTS

| | | |
|---|---|---|
| DE | 10224939 A1 | 1/2004 |
| DE | 112013005362 T5 | 7/2015 |
| DE | 102018200888 A1 | 7/2019 |
| DE | 102019211496 A1 | 2/2021 |
| WO | WO2016087535 A1 | 6/2016 |

OTHER PUBLICATIONS

United States Notice of Allowance, U.S. Appl. No. 29/867,407, filed Dec. 11, 2023, 08 pages.

J. Krzywinski, Usability Engineering: The Future of Human-Machine Interaction in Agricultural Engineering, Landtechnik (Agricultural Engineering) 72(6), 2017, pp. 305-307, 10.15150/lt.2017.3175.

* cited by examiner

SELF-PROPELLED AGRICULTURAL WORKING MACHINE

RELATED APPLICATIONS

This document claims priority based on German Patent Application No. 102021130011.8, filed on Nov. 17, 2021, which is incorporated by reference into this application.

DESCRIPTION

The invention relates to a self-propelled agricultural working machine.

BACKGROUND

A trend in agriculture which has already been observed for some time is the automation or at least a remote control of field work. Practically all working processes which have to be undertaken on a field for cultivating, plowing and harvesting the crops may be automated or remotely controlled. To this end, generally self-propelled working machines are used, i.e. vehicles provided with separate drives serving for the propulsion thereof, and the working implements which are respectively required are coupled thereto. Since according to the current legal situation these self-propelled working machines are not allowed to travel in road traffic without a human driver, and in most cases the place of use of the working machines on the fields to be cultivated may be reached only on public roads from the respective base location (agricultural business or contractor business, or the like), such self-propelled working machines (or at least a host vehicle which may be followed by further autonomous working machines on a virtual or real tow bar) also have to be provided with workstations so that an operator may move the vehicles on the public roads, although in principle the working machines per se may also be operated autonomously on the road. To this end, reference might be made to German Patent Application No. DE 197 05 842 A1, German Patent Application No. DE 102 24 939 A1 and J. Krzywinski, Usability Engineering: Die Zukunft der Mensch-Maschine-Interaktion in der Landtechnik (The Future of Human-Machine Interaction in Agricultural Engineering), Landtechnik (Agricultural Engineering) 72(6), 2017, Pages 305-307.

BRIEF DESCRIPTION

A self-propelled agricultural working machine comprising: a drive module with a load-bearing chassis which is supported on the ground by ground-engaging member; agricultural implements for performing an agricultural operation and which are couplable to the load-bearing chassis; an electronic control unit for controlling the ground-engaging member by at least one of automatic control and remote control; and an operator station with an operator interface, the operator station configured to be removably attached to the load-bearing chassis such that the operating station may be attached and manned by an operator while on public roads or removed for unmanned use during an agricultural operation and the drive module configured to be operated by at least one of automatic control and by remote control in order to reduce the ground compaction.

DRAWINGS

The above-mentioned aspects of the present disclosure and the manner of obtaining them will become more apparent and the disclosure itself will be better understood by reference to the following description of the examples of the disclosure, taken in conjunction with the accompanying drawing, wherein.

DETAILED DESCRIPTION

A self-propelled agricultural working machine comprising a drive module with a load-bearing chassis which is supported on the ground by steerable and drivable ground-engaging members, agricultural implements for cultivating a field and/or crops located thereon and which are couplable or coupled to the load-bearing chassis, an electronic control unit for controlling the ground-engaging member automatically and/or by remote control, as well as an operator station which is attached to the load-bearing chassis, with an operator interface for the manual control of the ground-engaging member by an operator.

The operator workstation in self-propelled working machines is generally fixedly attached (not removable during operation) and thus transported during the work on the field, although due to the automation and/or remote control of the working machine the operator workstation is not occupied and thus not required, and this results in a significant but undesirable ground compaction. Some cabs of self-propelled working machines has a mass in the order of magnitude of 1000 kg which in particular in the case of more lightweight, electrically operated working machine (see German Patent Application No. DE 10 2019 211 496 A1) certainly represents a significant proportion of the total mass and ground compaction thereof. Other approaches may involve transport of unmanned self-propelled working machines, typically not provided with an operator workstation, by means of a separate manned carrier vehicle (for example WO 2016/087535 A1) which results in redundancy which is disadvantageous since the carrier vehicle remains unused for the majority of the time.

Further yet, other approaches involve a series of non-agricultural working machines in which an operator workstation may be detached from the working machine during the work in order to be able to operate the working machine remotely from a distance and thus with less noise pollution and a reduced potential for hazards (See German Patent Application No. DE 11 2013 005 362 T5 in a horizontal drilling machine, U.S. Pat. No. 4,090,736 A for a mining vehicle, U.S. Pat. No. 5,638,619 A for a stump shredder in which the removable operator station consists only of a small device). In this case, the reason for the removable operator station is not the total mass or ground compaction which is entirely irrelevant in these non-agricultural working machines, but to bring the operator to a safe distance from the works, which in turn is not relevant in agricultural works, in particular where the working machines generally operate autonomously.

In order to address the myriad of issues of self-propelled agricultural vehicles, including but not limited to total mass and ground compaction by a cab which is not required during field work, it is proposed that the operator station is attached to the load-bearing chassis so as to be removable during operation, so that the working machine is movable with the operator station attached thereto by an operator on public roads and during the cultivation of a field is able to be operated with the operator station removed, automatically and/or by remote control by the electronic control unit in order to reduce the ground compaction. The implement may be configured for ground cultivation, for sowing or planting, for spraying or combating undesirable organisms and/or for harvesting plants or parts thereof. The operator station may be attached so as to be height-adjustable relative to the drive module by first and second actuators. This height adjustment, on the one hand, may facilitate climbing in and climbing out of the operator station and, on the other hand, may also serve for coupling and decoupling the operator station. The latter may take place automatically as is known per se from attaching working implements to a farm tractor or harvesting attachments to harvesting machines.

To this end, a mechanical coupling may be provided, said mechanical coupling being attached between the operator station and the drive module and being able to be detached and connected by an actuator. To this end, the coupling is able to be coupled by lifting a part of the coupling on the drive module side relative to a part of the coupling on the operator station side and is able to be detached by lowering a part of the coupling on the drive (or traction) module side relative to a part of the coupling on the operator station side. A suitable coupling is a so-called "Weiste triangle" which may be connected to the drive module by a three-point coupling provided with a power lift. However, any other couplings may also be used. Preferably, the coupling also provides an electrical connection between the operator station and the drive module, in particular galvanically or inductively. The operator station or a remote operator workstation may permit a monitoring and/or remote control of the drive module detached from the operator station.

Figure 1:
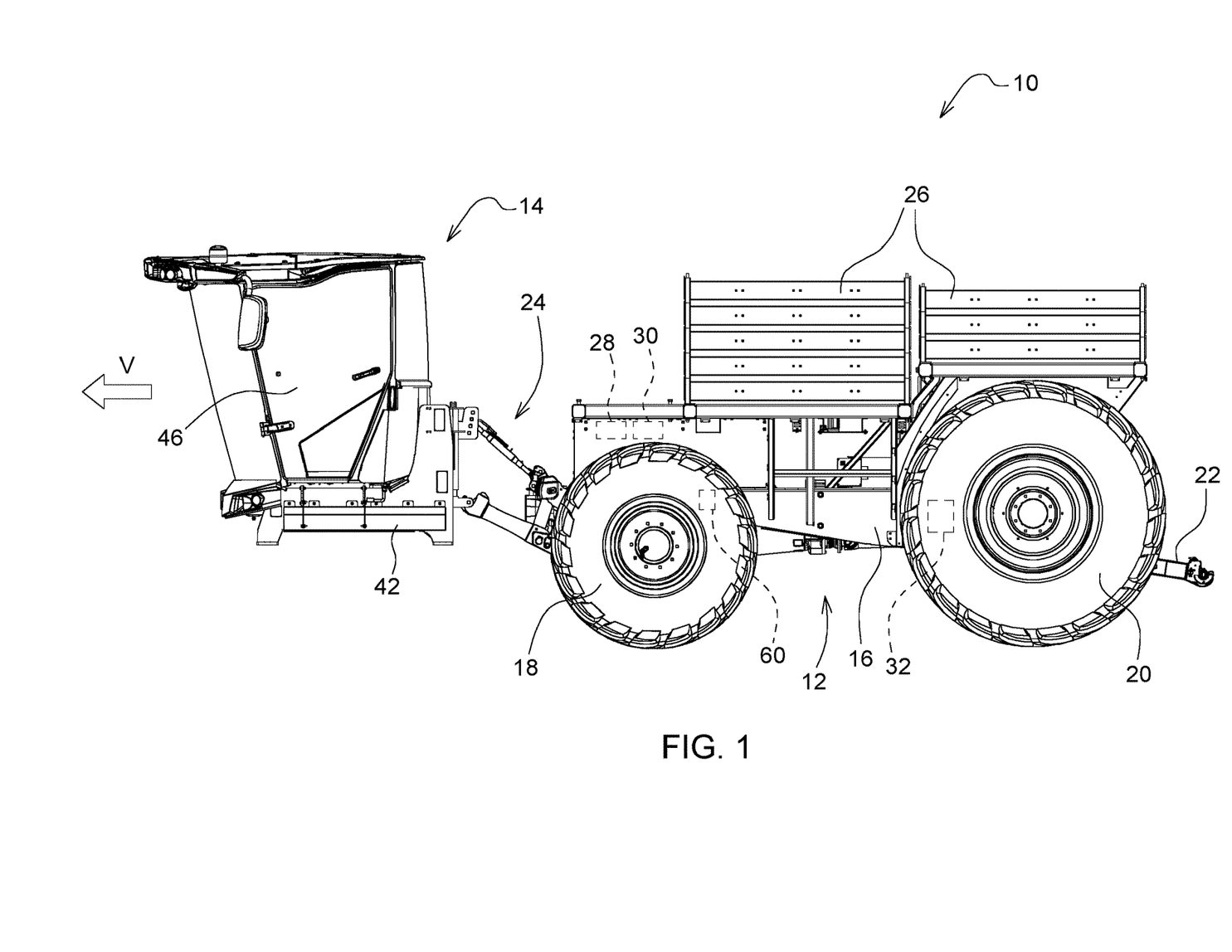
FIG. 1 shows a schematic side view of a self-propelled working machine.
Figure 2:
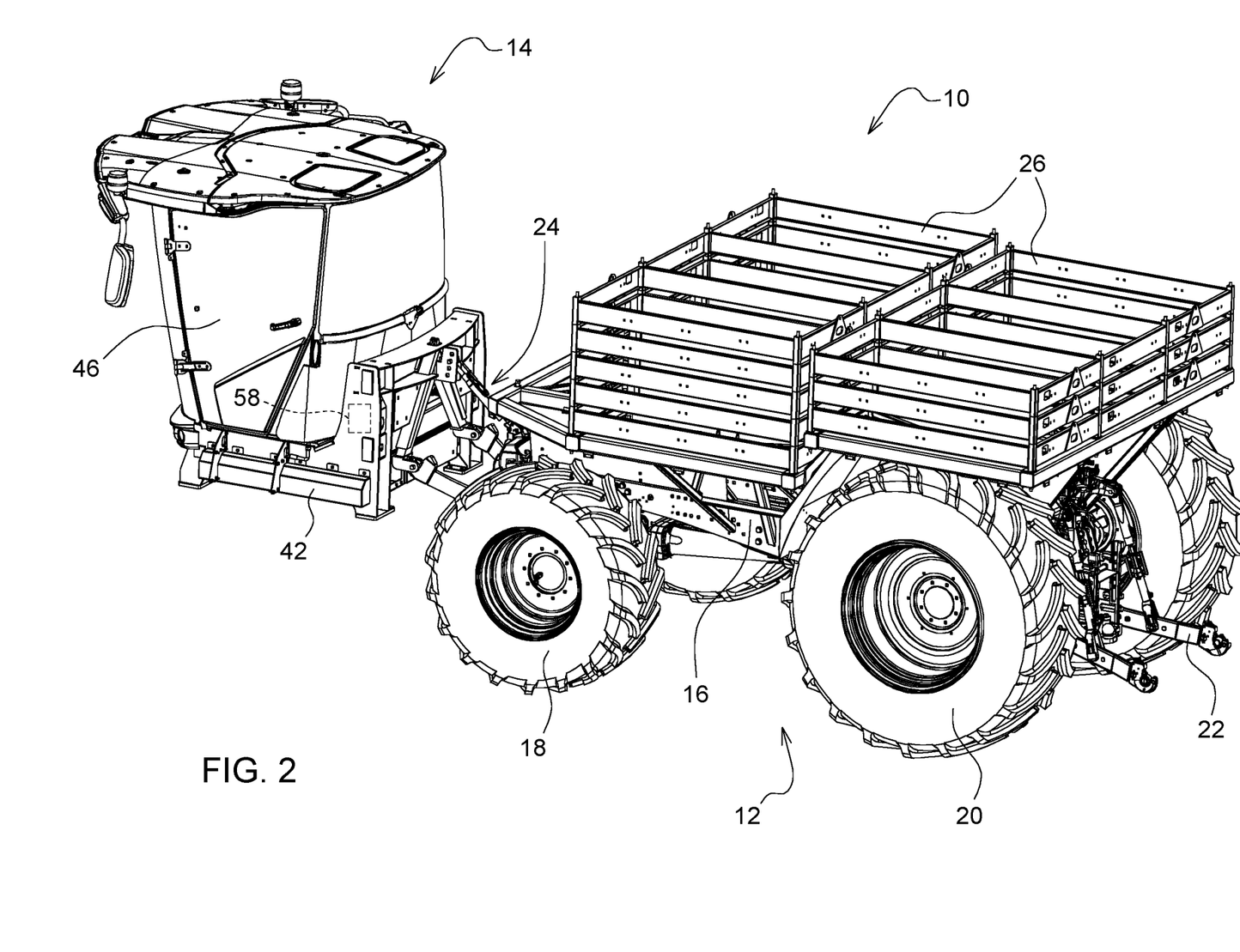
FIG. 2 shows a perspective view of the working machine from the rear and above.

A self-propelled agricultural working machine 10 is shown in FIGS. 1 and 2. The working machine is made up of a drive module 12 and an operator station 14 which may be removed and fastened thereto during operation. The drive module 12 comprises a load-bearing chassis 16 which is supported on the ground by drivable and steerable ground-engaging member 18, 20.

In the example, the ground-engaging member 18, 20 are designed as wheels, the front ground-engaging member 18 and/or the rear ground-engaging member 20 thereof being steerable. Similarly, the rear ground-engaging member 20 and/or the front ground-engaging member 18 are drivable. However, any other configurations of the ground-engaging member 18, 20 are conceivable. In particular, the ground-engaging member may be designed as two or four caterpillar track drives, optionally in combination with wheels, or comprise a larger number of wheels than shown. The steering may be implemented by adjusting the angle of the ground-engaging member about the vertical axis, by designing the load-bearing chassis 16 with articulated steering, and/or by different speeds on the left-hand and right-hand side.

The ground-engaging member 18 and/or 20 are drivable in order to transport the drive module 12 on a public road and to be able to perform a working process on a field. To this end, an energy source 28 may be provided on the load-bearing chassis 16, for example a battery (rechargeable battery) or a fuel cell or an internal combustion engine with a generator, which are connected to an electric motor 32 for driving the ground-engaging member 18, 20 so as to transmit energy. In the case of an internal combustion engine, a mechanical or hydraulic drive connection could also be provided with the driven ground-engaging member 18 and/or 20.

An electronic control unit 30 controls the speed of the ground-engaging member 18, 20 via the motor 32 (or the inverter thereof or the like) and controls the ground-engaging member 18 and/or 20 in terms of steering via a steering controller 60 which steers the drive module 12 in the above-described manner. Thus, the control unit 30 controls the speed and direction of travel of the self-propelled working machine 10.

The load-bearing chassis 16 bears on its upper face any implement 26 for cultivating an agricultural field. In FIGS. 1 and 2, the implement 26 is shown as a container, agricultural products, which may be harvested by a harvesting machine or by hand from the field, being able to be transported thereby. Instead of the implement 26 shown, any other implement by which an agricultural process is carried out on a field may be connected to the load-bearing chassis 16, whether for ground cultivation, for sowing or planting, for spraying or for any other manner of combating undesirable organisms such as insects, fungi or weeds or for harvesting plants or parts thereof. A further implement, not shown, which is folded in for travel on a road and folded out for operation on the field, may be fastened to a rear interface 22 of the load-bearing chassis 16 which is designed in the form of a three-point coupling.

Figure 3:
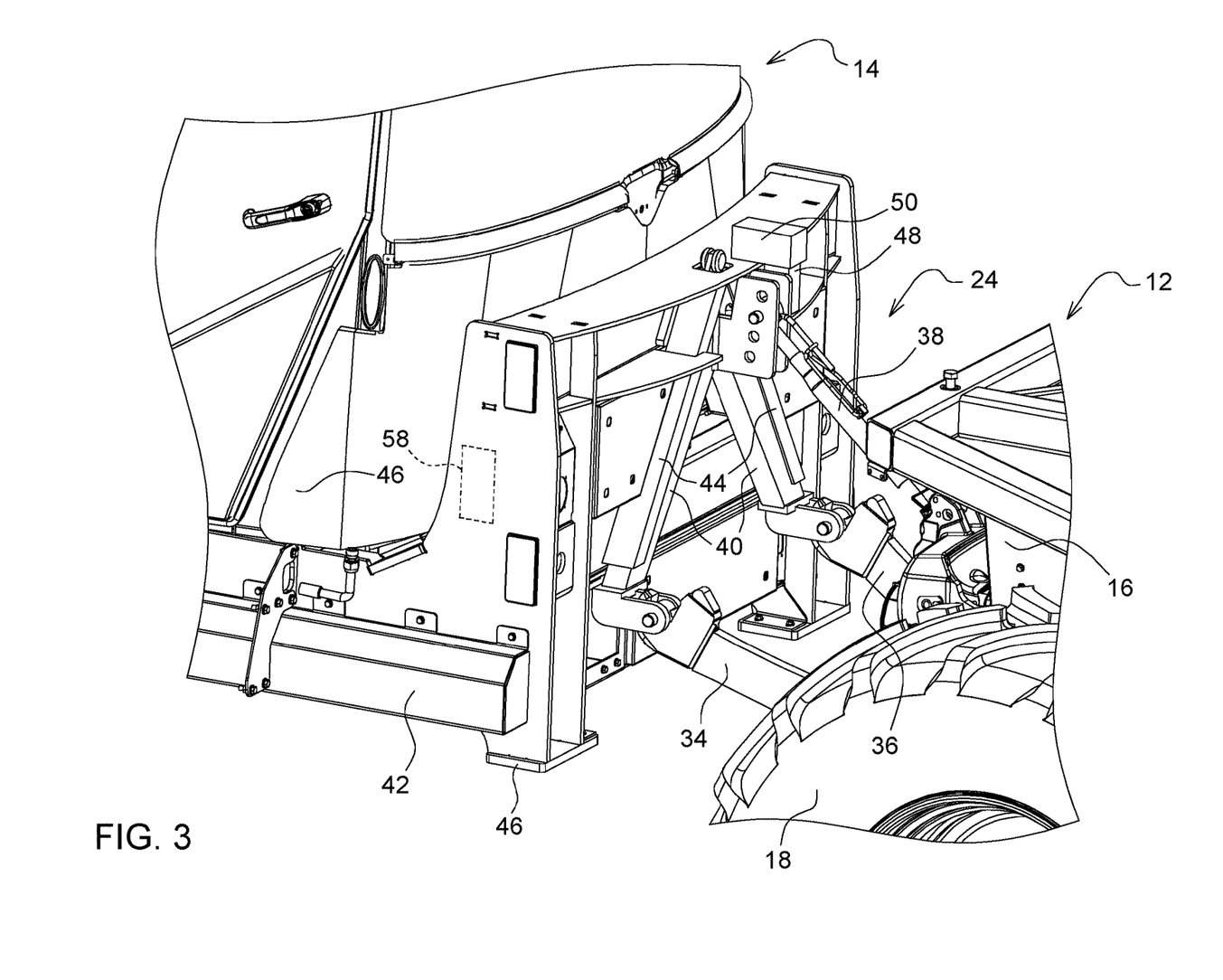
FIG. 3 shows an enlarged view of the attachment of the operator station.
Figure 4:
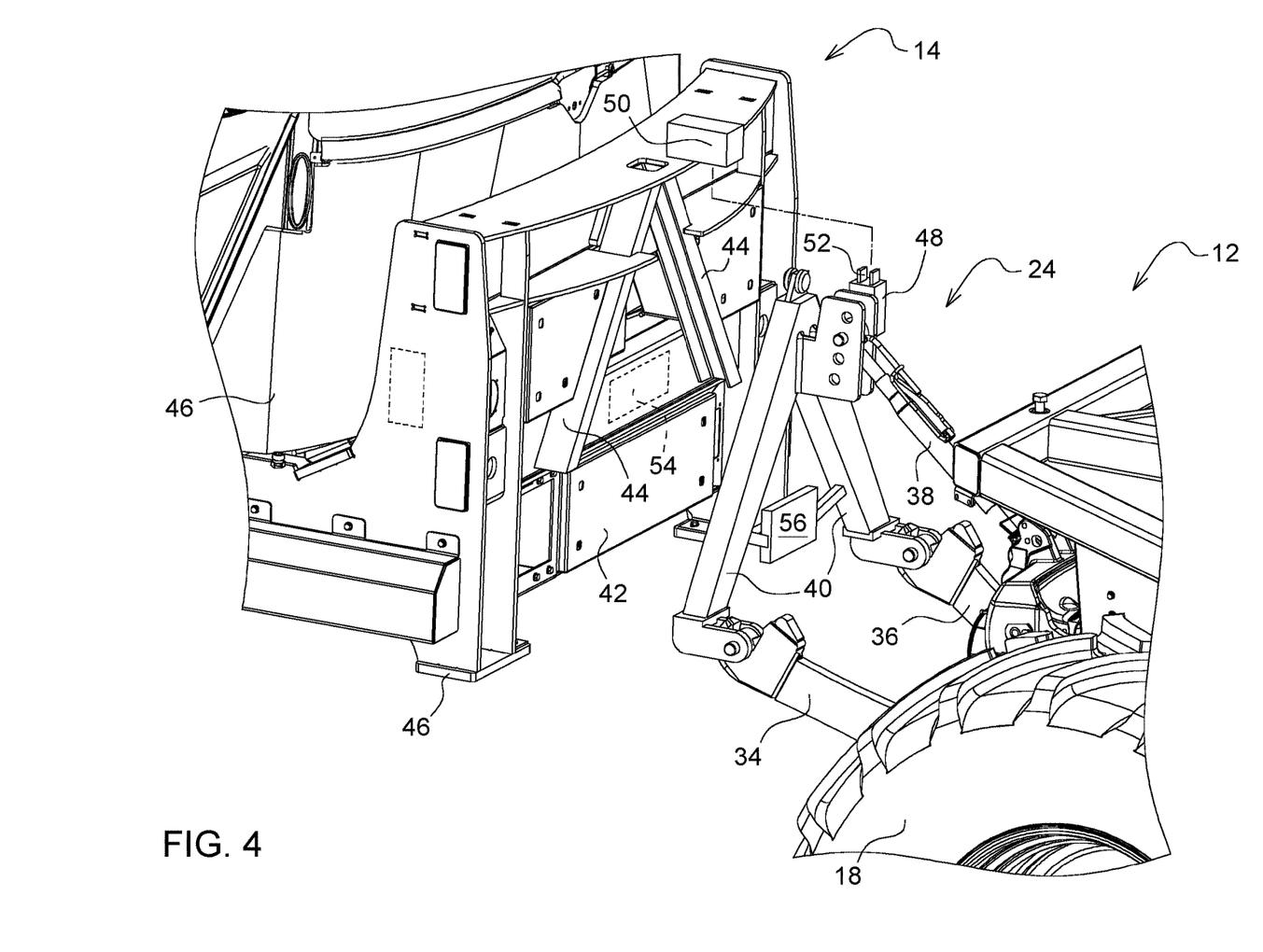
FIG. 4 shows the view according to FIG. 3 with the cab removed.

A front interface 24 in the form of a three-point coupling, which is shown in more detail in FIGS. 3 and 4, is attached to the front face of the drive module 12 (the self-propelled working machine 10 is moved in normal working mode in the direction V, i.e., to the left in FIG. 1). The operator station 14 is removably attached to the front interface 24.

Reference is now made to FIGS. 3 and 4 in which the attachment of the operator station 14 to the drive module 12 is shown in more detail. The front interface 24 is designed as a so-called three-point coupling and thus comprises two lower links 34, 36 arranged adjacent to one another and an upper link 38, two carrier elements 40 being attached to the front ends thereof, said carrier elements forming a triangle with an upper point which is pivotably connected to the upper link 38 about an axis running transversely to the forward direction V and horizontally. Similarly, the lower ends of the carrier elements 40 are coupled to one of the lower links 34, so as to be pivotable about an axis running transversely to the forward direction V and horizontally in each case. The lower links 38 are height-adjustable by a power lift, not shown but known per se (see for example German Patent Appl. No. DE 10 2018 200 888 A1), i.e. articulated at their rear ends on the load-bearing chassis 16 about axes running transversely to the forward direction V and horizontally, and are pivotable relative to the chassis 16 by an actuator 92 (see FIG. 5) which acts directly or indirectly, for example via a linkage, on the lower links 34, 36. Additionally, the upper link 38 may be longitudinally adjustable by an actuator 94 (FIG. 5).

The operator station 14 comprises a cab 46 which is fastened to a frame 42, feet 46 on which the frame may be supported on the ground being attached to the lower face thereof. The frame 42 extends on the lower face and on the rear face of the cab 46. Complementary support elements 44, which are fastened to the rear of the frame 42, cooperate with the carrier elements 40. The carrier elements 40 thus may be inserted from below into the support elements 44. The coupling of the operator station 14 and interface 24 implemented in this manner is known per se by the term "Weiste triangle" and is disclosed in German Patent Appl. No. DE 1 215 419 A. In contrast to that shown by way of illustration, a locking device which is releasable and securable by actuator or by hand could be provided between the support elements 44 and the carrier elements 40 or at a different point between the operator station 14 and the front interface 24, in order to prevent an undesired release of the connection, for example in the case of accidents.

An electrical connection between the operator station 14 and the drive module 12 (or the electronic control units 30, 58 thereof) may be produced by a (galvanic) plug connection, which is arranged, for example, in the vicinity of the upper point of the support elements 44 and the carrier elements 40 and comprises an element 48 on the drive module side and an element 50 on the operator station side. Either one of the elements 48, 50 (in FIG. 4 the element 48) is designed as a bushing and the respective other element as a plug (with pins 52). The electrical connection is automatically produced when coupling the operator station 14 to the drive module 12, and automatically disconnected again when detached. Alternatively, or additionally, an inductive connection is conceivable by two coils 54, 56, one thereof being assigned to the drive module 12 and the other to the operator station 14.

Figure 5:
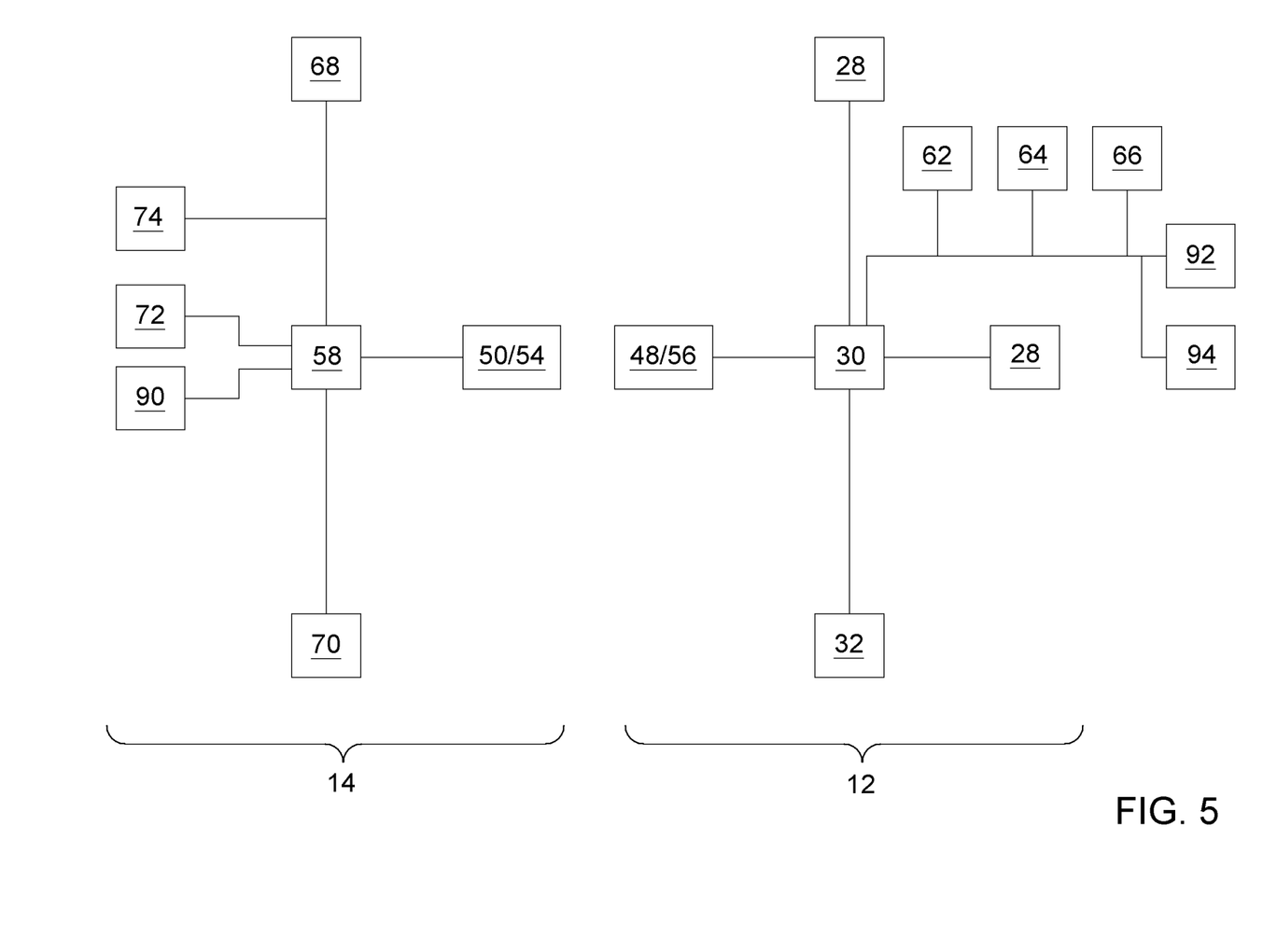
FIG. 5 shows a diagram of the electronic controllers of the working machine and the elements connected thereto.

FIG. 5 shows schematically the electronic control units 30, 58 of the self-propelled working machine 10 and the elements connected thereto. In addition to the above-described electrical or inductive connections with the elements 48, 50 and/or coils 54, 56 which serve for transmitting electrical current and communication signals between the control units 30, 58, and the connection of the control unit 30 to the motor 32 and the steering controller 60, the electronic control unit 30 of the drive module 12 is connected to the energy source 28, a position determining unit 62 for receiving signals of a global satellite navigation system and the determining of the position based thereon, a sensor system 64, and a wireless communication unit 66 operating according to any protocol such as a WLAN or a mobile radio standard, in order to permit a remote-controlled or autonomous operation of the drive module 12 and the working implement 26. The control unit 48 of the operator station 14 is connected to a wireless communication unit 68 which may be connected to the communication unit 66, to a back-up battery 70, to a speed predetermining device 72 which may be actuated by the operator such as a drive lever or pedal for predetermining speed and to a steering predetermining device 74 such as a steering wheel or joystick which may be actuated by the operator for the steering. A further input device 90 of the operator station 14 serves for controlling the actuator 92 of the power lift of the lower links 34, 36 and an actuator 94 for the longitudinal adjustment of the upper link 24.

The back-up battery 70 (rechargeable battery) of the operator station 14 could be constructed as an energy source which is independent of the drive module 12, for example in the form of a 400 V battery. This battery may be integrated in the frame 42 below the cab 46 and ensure a full days energy supply of the control unit 58 of the operator station 14 and an electrically driven air-conditioning compressor which is used for cooling the cab interior. For charging the back-up battery, an integrated charging device which permits the charging on a commercially available 32A CEE plug socket is used. Also conceivable are a voltage converter for providing the operating voltage required for the control unit 58 and a water cooling therefor. In order to permit a simple coupling of the operator station 14 and the controller of remote vehicles (see FIG. 7), in such an example all communication connections of the operator station 14 may be designed to be wireless relative to the surroundings, the electrical or inductive connections with the elements 48, 50 and/or coils 54, 56 accordingly being dispensed with. Said connections, however, may also serve to charge the back-up battery 70 in the case of a connection coupled to the drive module 12 and/or to permit the communication between the control units 30, 58 irrespective of the communication units 66, 68, when the operator station 14 is coupled to the drive module 12.

Figure 6:
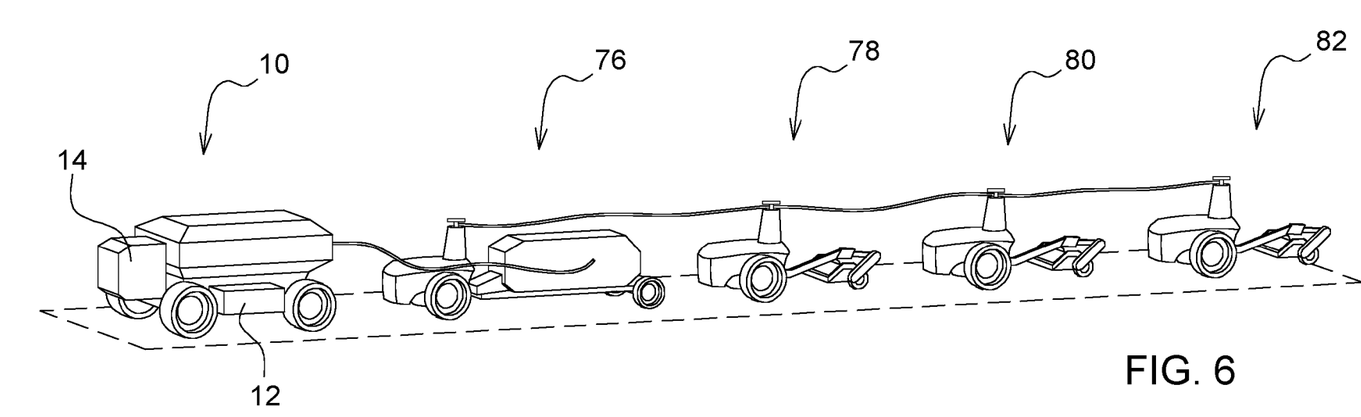
FIG. 6 shows a view of the working machine and further self-propelled working machines controlled thereby during travel on a road.
Figure 7:
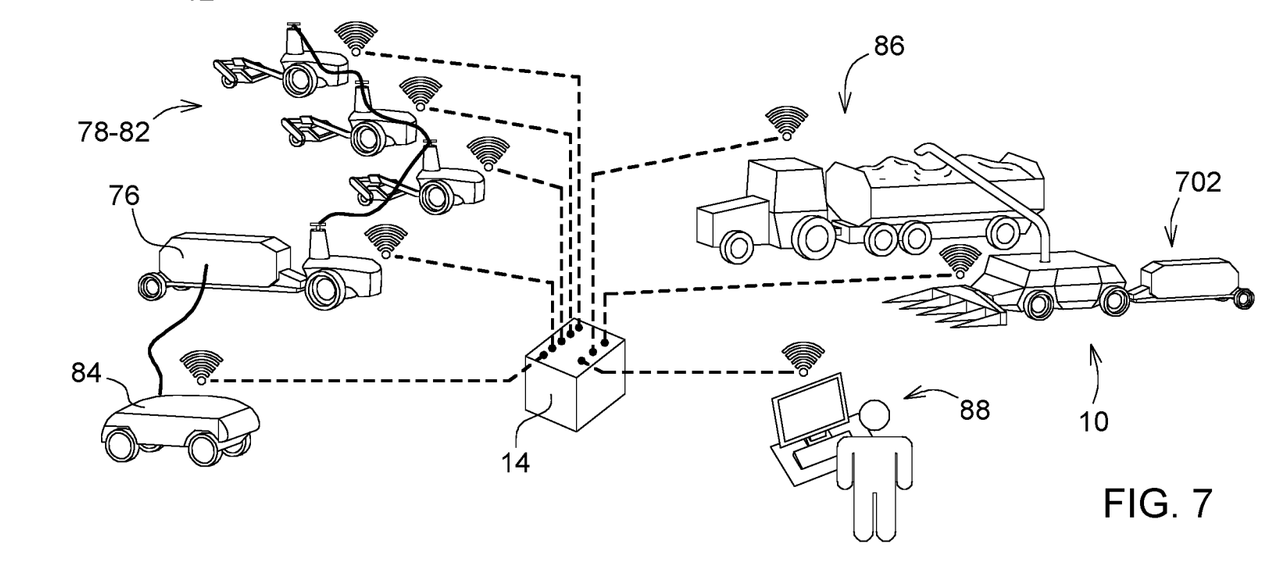
FIG. 7 shows a view of the working machines shown in FIG. 6 during work on a field.

All things considered, the working machine 10 according to the invention permits a method which is shown in FIGS. 6 and 7. The operator station 14 is attached to the drive module 12 as shown in FIGS. 1 to 3 for the road transport of the self-propelled working machine 10, the load-bearing chassis thereof in FIGS. 6 and 7 carrying a different working implement 26 from that in FIGS. 1 to 4, namely harvesting devices of a forage harvester. An operator sitting in the operator station 14 steers the working machine 10 by hand and also predetermines the speed thereof, by using the speed predetermining device 72 and the steering predetermining device 74. These operator interfaces provide electrical signals to the electronic control unit 58 of the operator station 14 which transmits these signals (via the elements 48, 50 shown in FIGS. 3 and 4 and/or the coils 54, 56 and/or the wireless communication units 66, 68) to the electronic control unit 30 of the drive module 12, which in turn controls the motor 32 and the steering controller 60.

Further self-propelled working machines 76 to 82 may follow the working machine 10, controlled by wire as shown in FIG. 6, or wirelessly, and steered by the operator in the operator station 14. The working machines 10 and 76 to 82 thus form a type of convoy, the vehicles thereof being connected together by an electronic tow bar. A single operator is thus able to drive a whole series of working machines from the base location thereof to the work on a field and back again.

The method when working on the field is shown in FIG. 7. The operator station 14 as shown in FIG. 4 is detached from the drive module 12 and deposited at a suitable point, for example at the edge of the field to be cultivated. To this end, after the operator has steered the working machine 10 and the operator station 14 to the desired point, the operator may correspondingly activate the actuators 92, 94 by the input device 90. In particular, a sequence "lower and detach the operator station" may be simply called up, which leads to the automatic deposit of the operator station 14 on the ground and to the removal of the drive module 12 therefrom. In this case, the electrical connection between the drive module 12 and the operator station 14 is disconnected but a remote control via the communication units 66, 68 still remains possible. A reverse sequence is conceivable for the reattachment.

The input device 90 also provides the option in combination with the actuators 92, 94 for the operator station 14 to be moved as far as possible downwardly after the end of the works or for climbing out of the operator station, even if it is to remain on the drive module 12, in order to facilitate climbing in and climbing out of the operator station. A ladder or the like is thus not required, which is beneficial for older or disabled operators. When traveling, the operator station 14 may be similarly lifted in order to permit the operator an improved view when driving. When the operator station is not lowered, by suitable activation of the actuators 92, 94, on the basis of suitable inclination sensors, a levelling of the operator station 14 may also be permitted in the forward and optionally also in the transverse direction.

Optionally after disconnecting the electrical connections between some or all of the working machines 10 and 76 to 82, a remote-controlled or automatic operation of the vehicles 10 and 76 to 82, optionally also of further autonomous, remote-controlled or manually controlled working machines 84, 86, may now be started on the field in order to carry out one of the above-described agricultural jobs or tasks. In this case, the working machine 10 may be automatically and autonomously controlled by the control unit 30 on the basis of the signals of the position determining unit 62, the sensor system 64 and the communication unit 66. Generally, the electronic control device 30 receives a task which it processes using the signals of the sensor system 64 (as a feedback signal via work completed and/or as an input signal for determining physical variables on the field) and of the position determining unit 62, and transmits corresponding status messages via the communication unit 66 (and optionally as shown in FIG. 7 the communication unit 68 serving as a relay station) to an operator workstation 88 which may be located at the base location (farm premises, company premises) of the working machines 10 and 76 to 82 or at any other location (including the operator station 14) in order to permit a monitoring and control and a rescheduling of the work, if required, by feedback of the arrangements or changed tasks to the working machine(s) 10 and 76 to 82. In each case, the working machines 10 and 76 to 86 may process working tasks which are specific thereto or partially or collectively as a whole, as a so-called field swarm.

After the end of the work, the operator station 14 may be coupled again to the drive module 12 and the operator, who in the meantime has traveled by foot or has traveled by a vehicle (for example a scooter, bicycle) transported to any location, or has been fetched, drives the working machine(s) 10 and optionally 76 to 82 to the next field or back to the base location.

It may be identified that by removing the operator station 14 during the field work, the ground compaction brought about by the working machine 10 is substantially reduced on the field.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

The invention claimed is:

1. A self-propelled agricultural working machine comprising:
   a drive module with a load-bearing chassis which is supported on the ground by ground-engaging member;
   agricultural implements for performing an agricultural operation and which are couplable to the load-bearing chassis;
   an electronic control unit for controlling the ground-engaging member by at least one of automatic control and remote control; and
   an operator station with an operator interface, the operator station configured to be removably attached to the load-bearing chassis such that the operating station may be attached and manned by an operator for road use or removed for unmanned use during an agricultural operation with the drive module configured to be operated by at least one of automatic control and by remote control in order to reduce the ground compaction.

2. The working machine of claim 1 wherein the implements are configured for at least one of cultivation, planting, spraying, combating undesirable organisms and harvesting of a crop.

3. The working machine of claim 2 wherein the operator station is attached so as to be height-adjustable relative to the drive module by at least one actuator.

4. The working machine of claim 3 wherein the operator station is able to be automatically detached from the drive module and connected thereto.

5. The working machine of claim 4 wherein a mechanical coupling is provided, the mechanical coupling attached between the operator station and the drive module and being able to be detached and connected by the at least one actuator.

6. The working machine of claim 5 wherein the mechanical coupling is coupled by lifting a portion of the mechanical coupling on a drive module side relative to a portion of the mechanical coupling on an operator station side and is detached by lowering a portion of the coupling on the drive module side relative to a portion of the coupling on the operator station side.

7. The working machine of claim 6 wherein the mechanical coupling is configured to provide an electrical connection between the operator station and the drive module.

8. The working machine of claim 7 wherein the electrical connection is produced by at least one of a galvanic and an inductive connection.

9. The working machine of claim 1 wherein the operator station or a remote operator workstation permits a monitoring or remote control of the drive module detached from the operator station.

10. A method for performing an agricultural operation with a self-propelled agricultural working machine, the method comprising:
- providing a drive module with a load-bearing chassis which is supported on the ground by ground-engaging member;
- providing agricultural implements for performing an agricultural operation and which are couplable to the load-bearing chassis;
- providing an electronic control unit for controlling the ground-engaging member by at least one of automatic control and remote control;
- providing an operator station with an operator interface, the operator station configured to be removably attached to the load-bearing chassis;
- operating the agricultural working machine with the operating station in road use, the operator station attached and manned by an operator; and
- operating the agricultural working machine with the operator station removed for unmanned use during an agricultural operation.

11. The method of claim 10 wherein the drive module configured to be operated by at least one of automatic control and by remote control in order to reduce the ground compaction.

12. The method of claim 11 wherein the implements are configured for at least one of cultivation, planting, spraying, combating undesirable organisms and harvesting of a crop.

13. The method of claim 12 wherein the operator station is attached so as to be height-adjustable relative to the drive module by at least one actuator.

14. The method of claim 13 wherein the operator station is able to be automatically detached from the drive module and connected thereto.

15. The method of claim 14 wherein a mechanical coupling is provided, the mechanical coupling attached between the operator station and the drive module and being able to be detached and connected by the at least one actuator.

16. The method of claim 15 wherein the mechanical coupling is coupled by lifting a portion of the mechanical coupling on a drive module side relative to a portion of the mechanical coupling on an operator station side and is detached by lowering a portion of the coupling on the drive module side relative to a portion of the coupling on the operator station side.

17. The method of claim 16 wherein the mechanical coupling is configured to provide an electrical connection between the operator station and the drive module.

18. The method of claim 17 wherein the electrical connection is produced by at least one of a galvanic and an inductive connection.

19. The method of claim 18 wherein the operator station or a remote operator workstation permits a monitoring or remote control of the drive module detached from the operator station.

* * * * *